(No Model.)
J. DEMAREST.
TRAP FOR SEWERS.
No. 317,099. Patented May 5, 1885.
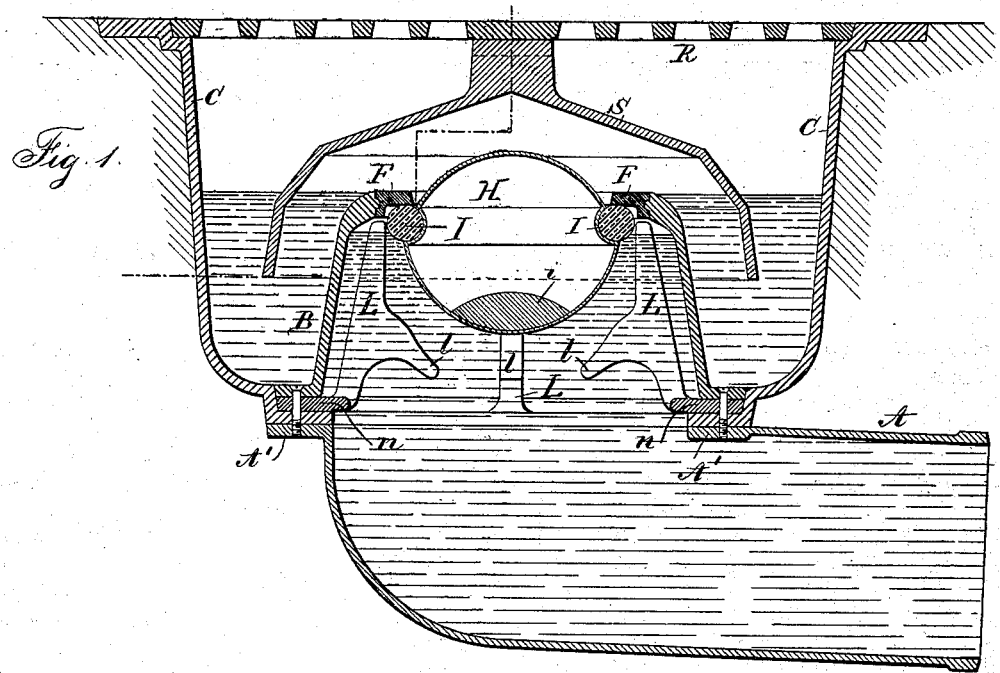
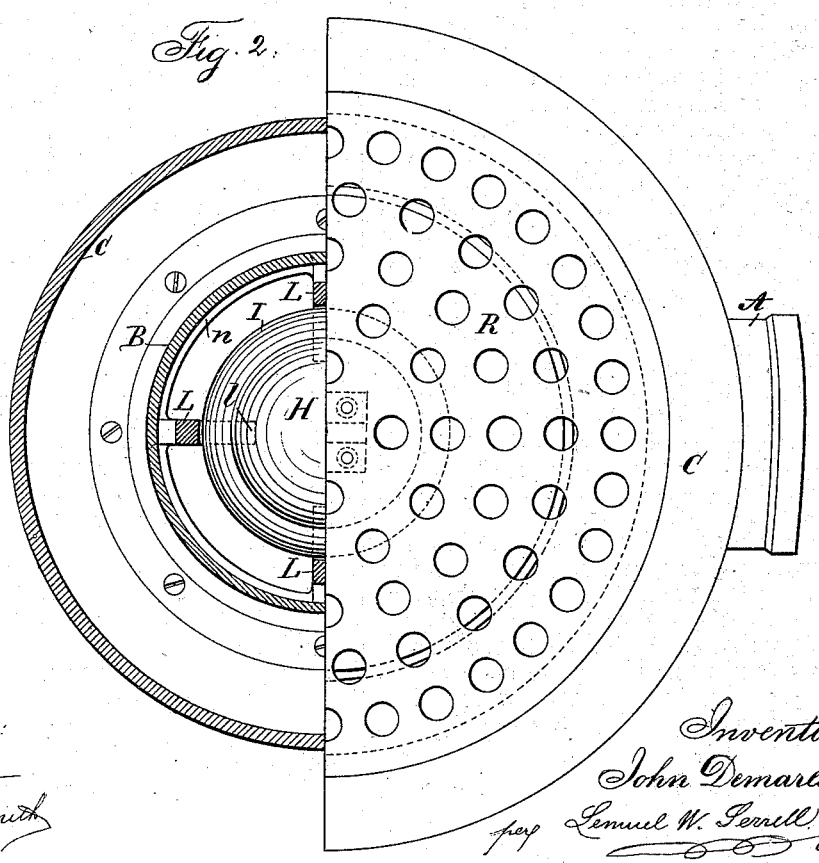
Witnesses:
J. Staib
Chas. H. Smith
Inventor:
John Demarest
per Lemuel W. Serrell
atty

United States Patent Office.

JOHN DEMAREST, OF NEW YORK, ASSIGNOR TO THE J. L. MOTT IRON WORKS, OF NEW YORK, N. Y.

TRAP FOR SEWERS.

SPECIFICATION forming part of Letters Patent No. 317,099, dated May 5, 1885.

Application filed February 9, 1885. (No model.)

*To all whom it may concern:*

Be it known that I, JOHN DEMAREST, of the city and State of New York, have invented an Improvement in Traps for Sewers, of which the following is a specification.

Sewer-connections are sometimes made from cellars, and under circumstances where rise of tide or heavy rains flood the sewer to such an extent as to back water up into the trap and cellar or other place.

The object of my invention is to combine in a cheap and comparatively inexpensive manner a back-water valve with the bell sewer-trap, so as to exclude water from running back through the trap into the building.

In the drawings, Figure 1 is a vertical section of the trap and valve, and Fig. 2 is a plan view, partially in section.

The sewer-pipe is represented at A, and around its upper end is the conical dam B, and also the basin C. The bottom flanges of B and C by preference set together, and are bolted to the flange A' at the upper end of the sewer-pipe A, suitable putty or cement being introduced to make the joint tight.

At the upper and inner edges of the dam B is a valve-seat, F, which is preferably a brass ring. This may be placed in the mold, and the iron forming the dam cast around it.

The float-valve H is preferably of sheet-copper in the form of a flattened spheroid, with a channel around its horizontal equator, and into this a ring of india-rubber, I, is introduced, and the bottom is weighted at $i$.

There are guides L (three or more in number) surrounding the float-valve, and having inwardly-projecting fingers, $l$, upon which the valve rests when in its normal position. These guides are preferably connected at their lower ends to a flange, $n$, that passes in between the bottom flanges of the dam B and of the basin C, the parts being all bolted together.

At the upper part of the basin there is a flange, and the grating R rests upon the inner edges of the basin, and there is a bell, S, either suspended from the grating R or supported by legs. The edges of this bell pass down into the water that is retained in the annular basin C, so as to exclude smell, as usual.

A sewer-trap has been made with an india-rubber ball-valve resting upon a ring; but the same is liable to adhere to the ring and become useless, and the ball and its ring occupy considerable space below the trap.

I claim as my invention—

1. In a trap for sewers, the combination, with the basin C, grating R, and the bell S, of a dam, B, having a valve-seat, F, at its upper inner edge, a weighted sheet-metal float-valve, H, with a recess formed around the equator of the same, a rubber ring, I, in said recess, a flange, $n$, guides L, and fingers $l$, substantially as specified.

2. A weighted sheet-metal float having a recess around its equator and a rubber ring in such recess, in combination with the sewer-pipe, the basin having a dam the inner top edge of which forms the valve-seat, a bell over the dam, and supports for the valve within the dam, substantially as specified.

3. In a trap for sewers, the combination, with the basin C, grating R, and the bell S, of a dam, B, having a valve-seat, F, at its upper inner edge, a float-valve, H, the guides L, and fingers $l$, substantially as specified.

Signed by me this 4th day of February, A. D. 1885.

JOHN DEMAREST.

Witnesses:
   GEO. T. PINCKNEY,
   WILLIAM G. MOTT.